(12) United States Patent
Kato et al.

(10) Patent No.: US 10,422,400 B2
(45) Date of Patent: Sep. 24, 2019

(54) STRUCTURE OF STEERING WHEEL FOR VEHICLE

(75) Inventors: Yousuke Kato, Yokohama (JP); Hiroyasu Kumagawa, Yokohama (JP); Norihisa Shiraishi, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/114,031

(22) PCT Filed: Apr. 12, 2012

(86) PCT No.: PCT/JP2012/059980
§ 371 (c)(1),
(2), (4) Date: Jan. 9, 2014

(87) PCT Pub. No.: WO2012/147524
PCT Pub. Date: Nov. 1, 2012

(65) Prior Publication Data
US 2014/0174868 A1    Jun. 26, 2014

(30) Foreign Application Priority Data

Apr. 27, 2011 (JP) .................................. 2011-099467

(51) Int. Cl.
| F16F 7/108 | (2006.01) |
| F16F 7/10  | (2006.01) |
| B62D 7/22  | (2006.01) |

(52) U.S. Cl.
CPC ............ *F16F 7/1028* (2013.01); *B62D 7/222* (2013.01); *F16F 7/10* (2013.01)

(58) Field of Classification Search
CPC .. F16F 7/1028; F16F 7/10; F16F 7/104; F16F 7/108; F16F 7/116; B62D 7/222; B62D 1/11; B62D 7/22
(Continued)

(56) References Cited

U.S. PATENT DOCUMENTS

2002/0113351 A1* 8/2002 Kato ....................... F16F 7/108
                                                     267/141
2002/0144873 A1* 10/2002 Kato et al. ................... 188/378
(Continued)

FOREIGN PATENT DOCUMENTS

| EP | 2085290 A1 * | 8/2009 | ............... B62D 7/22 |
| JP | 2002-145075 A | 5/2002 | |

(Continued)

OTHER PUBLICATIONS

International Search Report of PCT/JP2012/059980, dated Jul. 10, 2012, 2 pages.

*Primary Examiner* — Bradley T King
*Assistant Examiner* — Stephen M Bowes
(74) *Attorney, Agent, or Firm* — Brinks Gilson & Lione (57) ABSTRACT

A vehicle steering wheel structure which, while having a configuration in which small damper masses are arranged in a distributed manner, can secure the same highly efficient vibration reducing effect as when a large damper mass is arranged, without increasing the required installation space and the cost. The vehicle steering wheel structure includes a plurality of damper masses arranged so as to be distributed in an inner region of a rim portion of a steering wheel; a connection member that connects these damper masses; and a damper module disposed in the inner region of the rim portion.

18 Claims, 8 Drawing Sheets

(58) Field of Classification Search
USPC .......................................... 74/552; 280/771
See application file for complete search history.

(56) References Cited

U.S. PATENT DOCUMENTS

| | | | |
|---|---|---|---|
| 2003/0019704 A1* | 1/2003 | Aoi et al. ..................... | 188/378 |
| 2005/0011713 A1* | 1/2005 | Yasumoto ............... | F16F 7/108 |
| | | | 188/373 |
| 2005/0242965 A1* | 11/2005 | Rieth et al. .................. | 340/575 |
| 2011/0120258 A1* | 5/2011 | Kondo et al. ................. | 74/552 |
| 2013/0076011 A1* | 3/2013 | Umemura et al. ......... | 280/728.2 |
| 2013/0255435 A1* | 10/2013 | Umemura et al. ............. | 74/552 |
| 2014/0260774 A1* | 9/2014 | Toshiaki et al. ............... | 74/552 |

FOREIGN PATENT DOCUMENTS

| | | | |
|---|---|---|---|
| JP | 2002-323087 A | | 11/2002 |
| JP | 2002323087 | * | 11/2002 |
| JP | 2003-040112 A | | 2/2003 |

* cited by examiner

STRUCTURE OF STEERING WHEEL FOR VEHICLE

BACKGROUND

1. Field of the Invention

The present invention generally relates to a vehicle steering wheel structure. More particularly, the invention relates to a vehicle steering wheel structure having a highly efficient vibration reducing effect.

2. Description of Related Art

In order to effectively reduce vibration of a steering wheel incorporated into a vehicle, it is necessary to provide a large (heavy) damper mass in the inner space of a rim portion of the steering wheel. The inner space of the rim portion of the steering wheel is very narrow because an airbag device, a horn component, a harness and the like are incorporated therein. When a damper mass is provided in a narrow space, it is difficult to secure a space for incorporating a large damper mass. Therefore, it is reasonable to arrange a plurality of small damper masses obtained by dividing the large damper mass, in a distributed manner. By doing so, it is possible to incorporate damper masses having a required weight into the narrow inner space of the rim portion.

Japanese Patent Application Publication No. 2002-145075 and Japanese Patent Application Publication No. 2002-323087 disclose vehicle steering wheel structures in which a plurality of damper masses for reducing vibration of a steering wheel is arranged so as to be distributed in the inner region of the rim portion of the steering wheel.

The "vibration damper for steering wheel" disclosed in Japanese Patent Application Publication No. 2002-145075 aims to provide a vibration damper for a steering wheel that is capable of reducing major vibration of the steering wheel by damping vibration in a rotational direction, in particular as well as vibration in a direction vertical to the direction of a steering shaft of the steering wheel. According to the vibration damper, a damper that includes a housing having an inner space and a weight inserted in the inner space of the housing in a non-bonded manner with a gap in relation to the housing is attached to a portion of a steering spoke portion near the steering wheel.

The "damping device" disclosed in Japanese Patent Application Publication No. 2002-323087 aims to provide a low-cost steering wheel damping device that can be easily manufactured and attached with a simple configuration. According to the damping device, a mass body is accommodated with a gap in a container-shaped holding portion that is molded integrally with a core bar or a lower cover of a steering wheel, and impact dampers covered with a cover member that is integrated with a switch attachment member are disposed symmetrically at the left and right positions of a boss portion. With such a simple configuration using existing members, the vibration reducing effect of the steering wheel can be easily obtained.

The individual small distributed damper masses cannot sufficiently damp vibration and it is not possible to secure such a vibration reducing effect as expected when a large damper mass is provided.

In order to secure the same vibration damping effect as when a large damper mass is provided, it is necessary to increase the weight of the individual small damper masses. When a plurality of small damper masses is arranged, it is not possible to obtain a sufficient vibration damping effect with the mass corresponding to one large damper mass. If the weights of the individual small damper masses are increased, the total weight becomes larger than that when a large damper mass is provided. Moreover, if the weight is increased, the dimensions increase although the damper masses are small, and the required installation space also increases. The problem of the increase in space can be solved when the material of the damper mass is changed to special material having larger specific gravity than cast iron or the like that is generally used. However, there is another problem in that the cost may increase if special material is used.

SUMMARY

The present invention has been made in view of the problems of the conventional art, and an object of the present invention is to provide a vehicle steering wheel structure which, while having a configuration in which small damper masses are arranged in a distributed manner, can secure the same highly efficient vibration reducing effect as when a large damper mass is arranged, without increasing the required installation space and the cost.

A vehicle steering wheel structure according to the present invention includes: a plurality of damper masses arranged so as to be distributed in an inner region of a rim portion of a steering wheel; a connection member that connects these damper masses; and a damper module disposed in the inner region of the rim portion.

Preferably, the vehicle steering wheel structure further includes a bracket which includes a mounting portion on which the damper module is mounted, and an attachment portion attached and fixed to the steering wheel, and which allows the damper module to be supported by the steering wheel, and the bracket and the damper module are connected by a damping member. Preferably, the connection member is coated with a damping member.

Preferably, the damper masses are arranged so as to be distributed in an annular form along the rim portion, in other words, in a shaft coupling peripheral region. Preferably, the connection member is formed in a closed ring form along the rim portion, and the damper masses are arranged at an interval in a circumferential direction of the connection member.

Preferably, the damper masses are disposed above and below the steering wheel that is at a neutral position. Preferably, the damper module is formed by integrating the connection member and the damper masses.

In the vehicle steering wheel structure according to the present invention, although small damper masses are arranged in a distributed manner, it is possible to secure the same highly efficient vibration reducing effect as when a large damper mass is arranged without increasing the required installation space and the cost. By connecting the damper masses by the connection member, it is possible to obtain sufficient vibration damping effect with smaller total mass as compared to when small damper masses are just arranged in a distributed manner.

DESCRIPTION OF THE PREFERRED EMBODIMENTS

Figure 1:
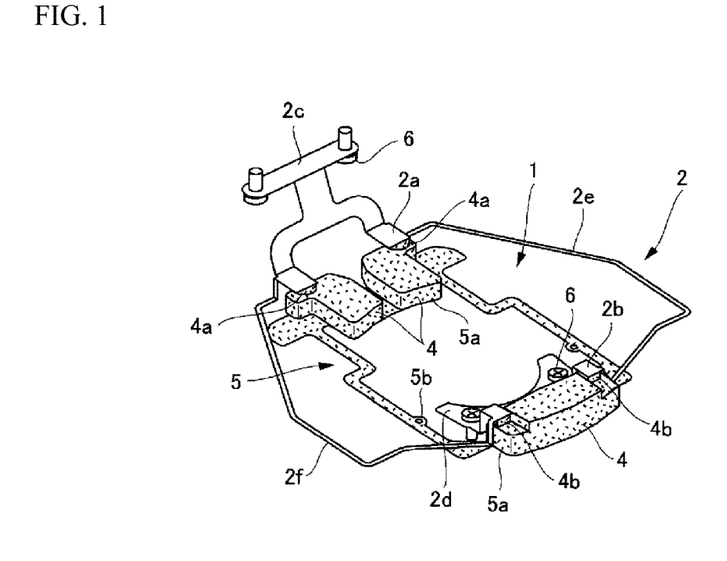
FIG. 1 is a perspective view as seen from a top side, of a damper module and a bracket employed in a preferred embodiment of a vehicle steering wheel structure according to the present invention.
Figure 2:
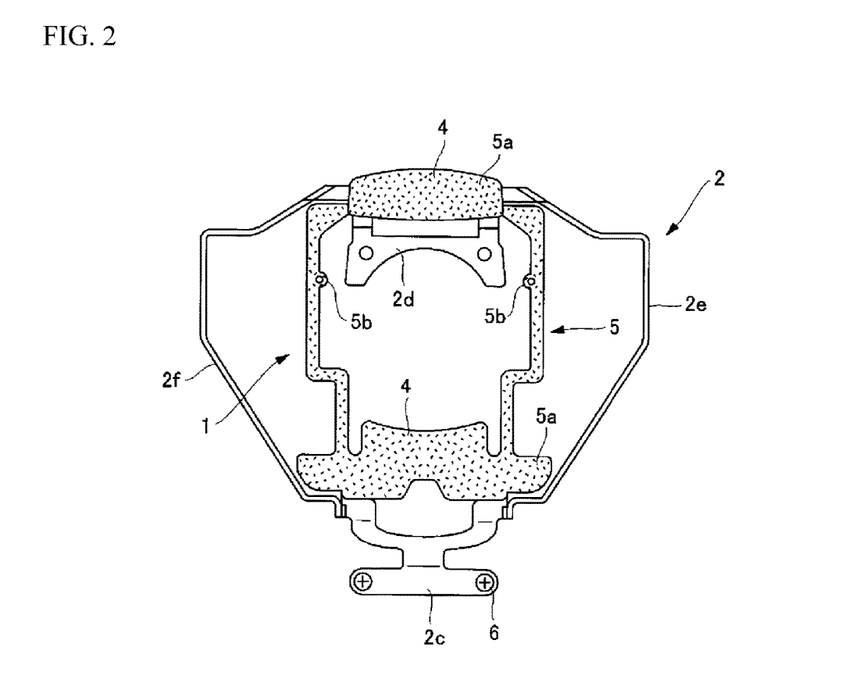
FIG. 2 is a plan view as seen from a back side, of the damper module and the bracket illustrated in FIG. 1.
Figure 3:
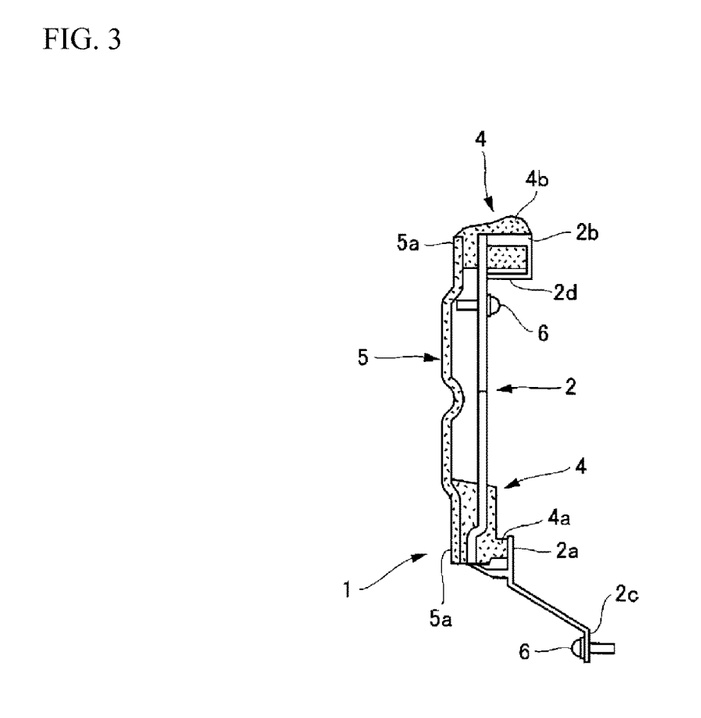
FIG. 3 is a side view of the damper module and the bracket illustrated in FIG. 1.
Figure 4:
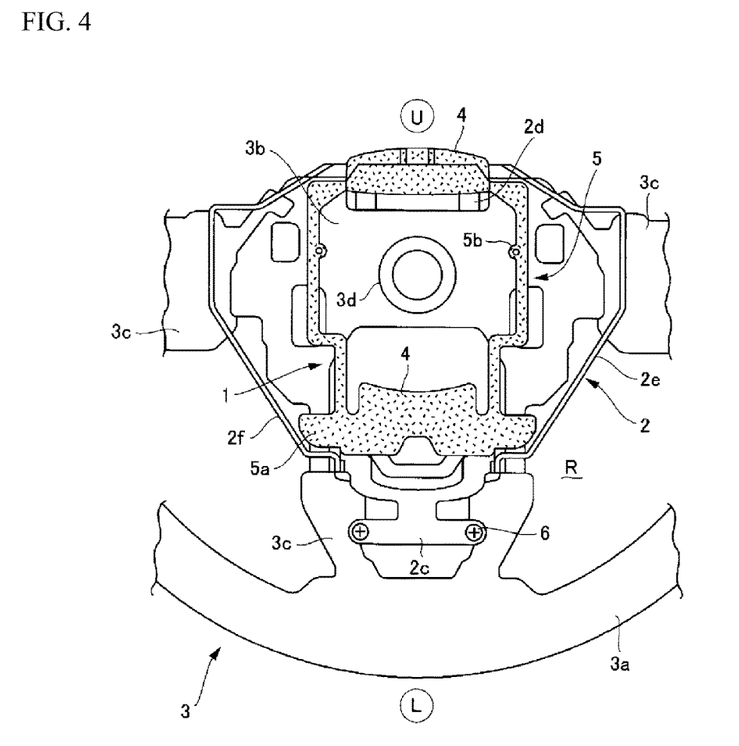
FIG. 4 is a plan view as seen from a back side, a state where the damper module and the bracket of FIG. 1 are incorporated into the steering wheel, illustrating a preferred embodiment of a vehicle steering wheel according to the present invention.
Figure 5:
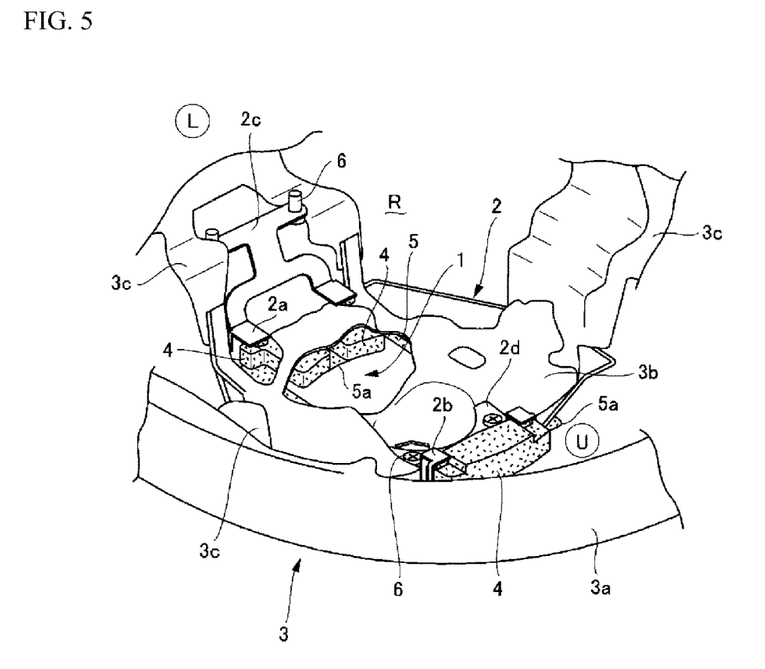
FIG. 5 is a perspective view as seen from above in a direction from the 2 o'clock position to the 8 o'clock position, of the vehicle steering wheel structure illustrated in FIG. 4.
Figure 6:
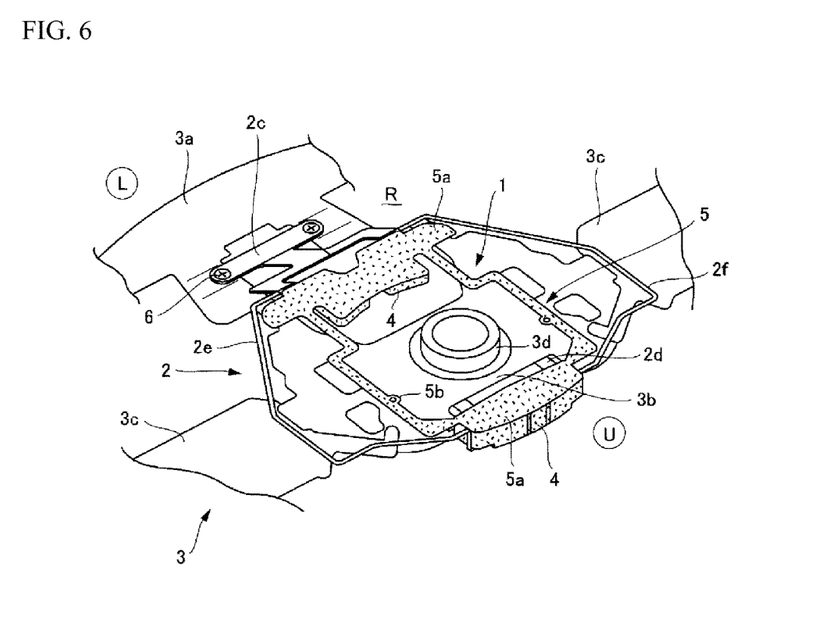
FIG. 6 is a perspective view as seen from below in the direction opposite to that of FIG. 5, of the vehicle steering wheel structure illustrated in FIG. 4.

Hereinafter, a preferred embodiment of a vehicle steering wheel structure according to the present invention will be described in detail with reference to the accompanying drawings. FIGS. 1 to 3 illustrate a damper module 1 and a bracket 2 attached to the damper module 1. FIGS. 4 to 6 illustrate the bracket 2 in a state where the damper module 1 is incorporated into an inner region R of a rim portion 3a of a steering wheel 3.

As is well known, the steering wheel 3 includes a shaft coupling portion 3d coupled to a steering shaft, an annular rim portion 3a that surrounds the shaft coupling portion 3d, and spoke portions 3c and a shaft coupling peripheral region 3b that connect the rim portion 3a and the shaft coupling portion 3d.

The shaft coupling peripheral region 3b is a portion that continuously extends from the spoke portion 3c to the shaft coupling portion 3d, and is not clearly distinguished from the spoke portion 3c in particular but means a region which includes an end portion of the spoke portion 3c and a periphery of the shaft coupling portion 3d and in which the end portion and the periphery are continuously connected.

In the illustrated example, the plurality of spoke portions 3c that extends obliquely from the rim portion 3a on the outer side toward the shaft coupling portion 3d on the inner side is formed to be integral with the rim portion 3a. End portions of the spoke portions 3c are bonded to the shaft coupling portion 3d via the shaft coupling peripheral region 3b, whereby the steering wheel 3 is formed. An airbag cushion and a horn device are incorporated into the inner region R of the rim portion 3a that surrounds the shaft coupling peripheral region 3b.

The damper module 1 and the bracket 2 are provided in the inner region R of the rim portion 3a of the steering wheel 3. The damper module 1 includes a plurality of damper masses 4 and a connection member 5. The damper module 1 including the damper masses 4 is provided in a range where the damper module 1 is accommodated in a back cover (not illustrated) of the steering wheel 3.

As is well known, the damper mass 4 includes a metal member that serves as a weight. The damper mass 4 is formed by applying rubber that exhibits spring action and reduces noise caused by contact with other members to the metal member. For example, the damper mass 4 is formed by superimposing a planar metal member and rubber and integrating the same by attaching the rubber to the metal member using vulcanized adhesion and damps vibration transferred from a vibrating source. Inexpensive cast iron is used as a material of the metal member, for example. Naturally, other metal materials can be also used.

The damper masses 4 are arranged so as to be distributed in the inner region R of the rim portion 3a, which has a small space due to the airbag cushion or the like incorporated therein. That is, small damper masses 4 obtained by dividing a large (heavy) damper mass necessary for obtaining required vibration damping effect into a plurality of pieces are individually disposed in a plurality of small spaces that can be secured in the inner region R of the rim portion 3a.

Specifically, these small damper masses 4 are arranged in an annular form on a side closer to the rim portion 3a than the shaft coupling portion 3d so as to be distributed in the shaft coupling peripheral region 3b (in other words, along the rim portion 3a) in order to effectively reduce vibration of the steering wheel 3. When the damper masses 4 are arranged in such an annular form, the steering wheel 3 having satisfactory weight balance can be obtained.

In the illustrated example, the damper masses 4 are arranged in the upper and lower parts (so-called "12 o'clock position" and "6 o'clock position" indicated by U and L in the drawings) of the steering wheel 3 positioned in the neutral position where the wheels of the vehicle are in the straight direction.

The arrangement of the damper masses 4 is not limited to the illustrated example, but may be arranged in the right and left portions ("3 o'clock position" and "9 o'clock position") in addition to these positions and may be disposed in the 3 o'clock position and 9 o'clock position instead of the 6 o'clock position and 12 o'clock position. Alternatively, the damper masses may be arranged at other positions. That is, the damper masses may be arranged at optional positions of the inner region R of the rim portion 3a as long as the damper masses positioned at such positions can reduce vibration of the steering wheel 3. Preferably, the damper masses 4 are arranged at such positions that the damper masses are symmetrical (point-symmetrical or bilaterally symmetrical) about the shaft coupling portion 3d with respect to the shaft coupling portion 3d.

The connection member 5 is disposed between the plurality of distributed damper masses 4 so as to connect these damper masses 4. The connection member 5 is formed in a plate strip form using cast iron or steel materials, for example. A wide mounting portion 5a, on which the damper mass 4 is mounted, is formed in a portion of the connection member 5 connected to the damper mass 4.

The connection member 5 and the damper mass 4 are connected according to various bonding methods such as mechanical bonding using bolts or the like or galvanized adhesion using rubber. In this manner, the damper module 1 is formed as a single component by integrally connecting the connection member 5 and the plurality of damper masses 4.

The connection member 5 connects the damper masses 4 to transfer vibration that the individual damper masses 4 bear to the other damper masses 4. In this manner, the distributed damper masses 4 complement vibration damping effect to share the vibration whereby a vibration reducing function of the plurality of damper masses 4 is secured.

Since the connection member 5 has its own weight and also vibrates when vibration is transferred between the damper masses 4, the connection member 5 functions as a mass for damping vibration together with the damper masses 4. The connection member 5 is coated with a damping material such as rubber, resin, or the like. By coating the connection member 5 with a damping material such as rubber, it is possible to suppress noise generated when the connection member makes contact with other members. The connection member 5 may not be coated with rubber.

The connection member 5 is formed in a closed ring form (endless annular form) in the shaft coupling peripheral region 3b (in other words, along the rim portion 3a). Due to this, the plurality of damper masses 4 is arranged at an interval in the circumferential direction of the connection member 5. In other words, the plurality of damper masses 4 is arranged in series in the inner region R of the rim portion 3a with the connection member 5 interposed.

By forming the connection member 5 in a closed form, it is possible to improve rigidity and to secure an excellent vibration transferring effect using the lightweight connection member. The connection member 5 may have an open form with a disconnected portion rather than the closed form. On the other hand, the connection member 5 may be formed as a plurality of plate strips, having both ends rather than the ring form, so that both ends of these plate strips are connected to the damper masses 4.

Figure 8:
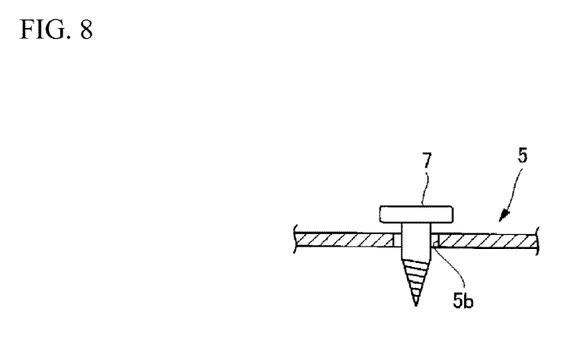
FIG. 8 is a cross-sectional view illustrating the state of a hole portion of a connection member that constitutes the damper module of FIG. 1.

A hole 5b is formed in the connection member 5 so that the connection member 5 can be locked to the steering wheel 3 with a relatively small slack in order to restrict unstable shaking of the connected damper masses 4 and the connection member 5 itself. As illustrated in FIG. 8, a pin, a screw 7 or the like in which a head part having a larger outer diameter than the inner diameter of the hole 5b is formed at the upper end thereof is passed through the hole 5b and fixed to the steering wheel 3. Due to this, it is possible to suppress large vertical motion of the connection member 5 and to prevent the occurrence of unnecessary shaking.

As described above, the connection member 5 and the plurality of damper masses 4 are connected to form the damper module 1 as a single component, and the damper module 1 is disposed in the inner region R of the rim portion 3a.

The damper module 1 and the bracket 2 are bonded in the mounting portions 2a and 2b of the bracket 2 described later using a damping member that contains materials such as rubber or resin that are more flexible than normal metal.

The bracket 2 is a belt-shaped member made from metal such as steel and has such outside dimensions that the bracket is accommodated in the inner region R of the rim portion 3a. The bracket 2 is formed in an approximately ring form so as to surround the damper module 1. The bracket 2 includes the mounting portions 2a and 2b on which the damper module 1 is mounted, attachment portions 2c and 2d attached and fixed to the steering wheel 3, and bridge portions 2e and 2f that connect the mounting portions 2a and 2b and the attachment portions 2c and 2d disposed at the "6 o'clock position" and the "12 o'clock position", respectively.

In the bracket 2 of the illustrated example, the first attachment portion 2c that protrudes outward along the spoke portion 3c and the second attachment portion 2d that protrudes inward toward the shaft coupling portion 3d are formed at positions near the damper masses 4 that are disposed at the "6 o'clock position" and the "12 o'clock position". The first attachment portion 2c is attached and fixed at two positions to the spoke portion 3c by screws 6, and the second setting step 2d is attached and fixed at two positions to the shaft coupling peripheral region 3b using screws 6.

Figure 7:
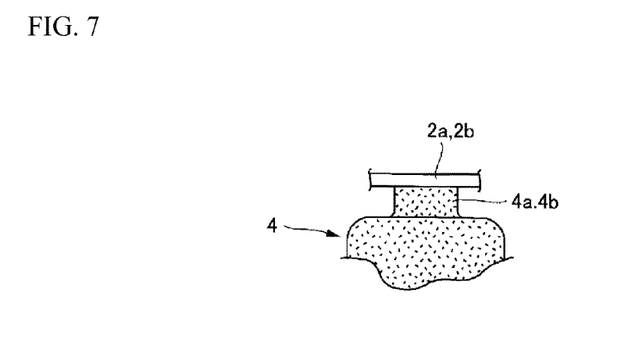
FIG. 7 is an enlarged view of a main part, illustrating a portion near a mounting portion of the bracket and the damper module illustrated in FIG. 1.

In the bracket 2, the first mounting portion 2a on which the damper module 1 is mounted is formed near the first attachment portion 2c with a columnar connecting portion 4a interposed, and the columnar connecting portion 4a is formed of a damping member such as a rubber and is provided in the damper mass 4 positioned at the 6 o'clock position. The first mounting portion 2a is bonded to the damper mass 4 by fitting simultaneously with the columnar connecting portion 4a or galvanized adhesion of rubber as illustrated in FIG. 7. In this way, the damper module 1 is integrally mounted on the bracket 2.

Moreover, in the bracket 2, the second mounting portion 2b on which the damper module 1 is mounted is formed near the second attachment portion 2d with a columnar connecting portion 4b interposed, and the columnar connecting portion 4b is formed of a damping member such as a rubber and is provided in the damper mass 4 positioned at the 12 o'clock position. The second mounting portion 2b is also bonded to the damper mass 4 by fitting simultaneously with the columnar connecting portion 4b or galvanized adhesion of rubber as illustrated in FIG. 7. In this way, the damper module 1 is integrally mounted.

The bracket 2, on which the damper module 1 is mounted, is attached and fixed to the steering wheel 3 by the first and second attachment portions 2c and 2d, whereby the damper module 1 is supported by the steering wheel 3.

The bridge portions 2e and 2f prevent distortion of the damper module 1 and relative misalignment of the attachment portions 2c and 2d and the mounting portions 2a and 2b when the damper module 1 is attached to the steering wheel 3.

Next, the operation of the vehicle steering wheel structure according to the present embodiment will be described. First, assembling processes will be described. The damper module 1 in which the damper masses 4 are connected by the connection member 5 is manufactured as a single component. Subsequently, the damper module 1 is mounted on the mounting portions 2a and 2b of the bracket 2 to manufacture the damper module 1 to which the bracket 2 is attached. Subsequently, the attachment portions 2c and 2d of the bracket 2 are attached and fixed to the steering wheel 3 whereby the damper module 1 is incorporated into the inner region R of the rim portion 3a and is supported by the steering wheel 3.

In the damper module 1 supported by the steering wheel 3, the total weight which is the sum of the weight of the plurality of damper masses 4 corresponds to the weight necessary for reducing vibration of the steering wheel 3, and an efficient vibration damping effect can be secured.

Since the plurality of damper masses 4 connected by the connection member 5 acts integrally, it is possible to secure a higher vibration damping effect as compared to the conventional art in which distributed damper masses act individually. Since the connection member 5 also works as an additional weight, it is possible to further improve the vibration damping effect. When the connection member 5 is coated with rubber, the rubber also contributes to the vibration damping effect and the performance can be improved.

As described above, according to the vehicle steering wheel structure of the present embodiment, it is possible to allow the plurality of damper masses 4 to function integrally by connecting the damper masses 4 using the connection member 5 while having a configuration in which small damper masses 4 are arranged in a distributed manner, and to secure the same satisfactory vibration reducing effect as when a large (heavy) damper mass is provided.

Since the damper masses 4 are just connected by the connection member 5, it is possible to prevent an increase in the required installation space and to easily incorporate the damper masses in the narrow inner space of the rim portion 3a. The damper masses 4 made from generally used materials can be used, and an increase in the cost resulting from material change can be prevented.

Since the individual damper masses 4 are bonded to the bracket 2 by a damping member (rubber or the like), the integrated damper module 1 connected by the connection member 5 can be connected to the steering wheel 3 in a wider range of areas, and the vibration damping performance can be improved.

The vehicle steering wheel structure includes the bracket 2 that includes the mounting portions 2a and 2b on which the damper module 1 is mounted, and the attachment portions 2c and 2d for attaching and fixing the damper module 1 to the steering wheel 3, and the bridge portions 2e and 2f can suppress deformation of the damper module 1 during attachment. Therefore, it is possible to easily attach the damper module 1 to the steering wheel 3.

Since the damper masses 4 are arranged so as to be distributed in an annular form along the rim portion 3a, it is possible to secure satisfactory weight balance of the steering wheel 3 and to secure the vibration damping effect of the steering wheel 3 in a well-balanced manner.

The connection member 5 is formed in a closed ring form along the rim portion 3a, and the damper masses 4 are arranged at an interval in the circumferential direction of the connection member 5. Therefore, by supporting the damper module 1 on the steering wheel 3, the damper masses 4 can be immediately arranged to be distributed in an annular form along the rim portion 3a, and the attachment operability can be improved. Moreover, it is possible to secure rigidity of the connection member 5 and to secure an excellent vibration damping performance.

Since the damper masses 4 are arranged in the upper and lower parts U and L of the steering wheel 3 positioned in the neutral position, it is possible to suppress vibration of the steering wheel 3 appropriately and effectively. Since the damper module 1 is formed by integrating the connection member 5 with the damper masses 4, the damper module 1 can be handled as a single component, and the attachment operability can be improved. Since the damper module 1 and the bracket 2 are integrated, it is possible to further improve the attachment operability.

The vehicle steering wheel structure described hereinabove is a preferred example of the present invention, and other embodiments may be implemented or executed using various methods. Unless specific limiting description is provided in the specification of this application, the present invention is not limited to the specific shapes, sizes, configurations, arrangements, and the like of the components illustrated in the accompanying drawings. Further, the expressions and terminology used in the specification of this application are provided for descriptive purposes, and unless specific limiting description is provided, the present invention is not limited to these expressions and terminology.

What is claimed is:

1. A vehicle steering wheel structure comprising:
   a plurality of damper masses arranged so as to be distributed in an inner region of a steering wheel;
   a connection member that connects the plurality of damper masses and is formed in a closed ring form with the plurality of damper masses, wherein the connection member is coated with a damping material; and
   the plurality of damper masses and the connection member forming a damper module disposed in the inner region of the steering wheel, wherein vibration is transferred between the plurality of damper masses via the connection member;
   wherein the plurality of damper masses are fixedly attached to the connection member and directly contact the connection member;
   wherein the connection member is a further damper mass and vibrates with the plurality of damper masses when vibration is transferred between the plurality of damper masses, and the connection member dampens vibration together with the plurality of damper masses;
   wherein the connection member extends along a connection member plane oriented transverse to a longitudinal axis of a shaft coupling portion, and the connection member is free to shift during vibration relative to the steering wheel.

2. The vehicle steering wheel structure according to claim 1, wherein the plurality of damper masses are arranged so as to be distributed in an annular form around the shaft coupling portion of the steering wheel, wherein at least a first damper mass of the plurality of damper masses is disposed diametrically opposite to at least a second damper mass of the plurality of damper masses.

3. The vehicle steering wheel structure according to claim 1, wherein the plurality of damper masses are arranged at spaced apart intervals in a circumferential direction of the connection member.

4. The vehicle steering wheel structure according to claim 3, wherein the connection member is formed in a plate strip form.

5. The vehicle steering wheel structure according to claim 1, wherein when the steering wheel is in a neutral position at least a first damper mass of the plurality of damper masses is disposed in an upper part of the inner region of the steering wheel and at least a second damper mass of the plurality of damper masses is disposed in a lower part of the inner region of the steering wheel.

6. The vehicle steering wheel structure according to claim 1, wherein the connection member is disposed between the plurality of damper masses.

7. The vehicle steering wheel structure according to claim 1, wherein the connection member is formed with a mounting portion and one of the plurality of damper masses being mounted on the mounting portion.

8. The vehicle steering wheel structure according to claim 1, wherein the plurality of damper masses are mounted to the connection member via at least one bolt.

9. The vehicle steering wheel structure according to claim 1, wherein the plurality of damper masses are bonded to the connection member.

10. The vehicle steering wheel structure according to claim 9, wherein the damper module is formed as a single component by integrally connecting the connection member and the plurality of damper masses.

11. The vehicle steering wheel structure according to claim 1, wherein the connection member that connects the plurality of damper masses has a closed loop shape such that the plurality of damper masses are connected to each other such that each damper mass of the plurality of damper masses is connected to an adjacent damper mass in a first direction of the closed loop shape, wherein, for each individual damper mass of the plurality of damper masses, a first portion of the connection member extends in the first direction along the closed loop shape of the connection member into a connection with the individual damper mass that is adjacent the individual damper mass in the first direction and a second portion of the connection member extends in a second direction along the closed loop shape of the connection member into a connection with the individual damper mass that is adjacent the individual damper mass in the second direction.

12. The vehicle steering wheel structure according to claim 1, wherein the damper module including the plurality of damper masses and the connection member is in the closed ring form so that the damper module improves rigidity and secures vibration transferring effect.

13. A vehicle steering wheel structure comprising:
a plurality of damper masses arranged so as to be distributed in an inner region of a steering wheel;
a connection member that connects the plurality of damper masses;
the plurality of damper masses and the connection member forming a damper module disposed in the inner region of the steering wheel;
wherein the plurality of damper masses are fixedly attached to the connection member and directly contact the connection member; and
a bracket having a mounting portion and an attachment portion, the damper module being mounted on the mounting portion, and the attachment portion being attached and fixed to the steering wheel, and the bracket thereby allowing the damper module to be supported by the steering wheel, wherein the damper module, having the connection member and the plurality of damper masses, is mounted to the mounting portion of the bracket via the plurality of damper masses; and
the bracket and the damper module further being connected by a damping member;
wherein, for each individual damper mass of the plurality of damper masses, the damping member is fixedly attached to and disposed between the individual damper mass and the bracket;
wherein when the steering wheel is in a neutral position, at least a first damper mass of the plurality of damper masses is disposed in an upper part of the inner region of the steering wheel and at least a second damper mass of the plurality of damper masses is disposed in a lower part of the inner region of the steering wheel;
wherein the connection member is not directly fixed to the bracket.

14. The vehicle steering wheel structure according to claim 13, wherein the connection member is coated with a damping material.

15. The vehicle steering wheel structure according to claim 13, wherein the connection member has a closed ring form.

16. The vehicle steering wheel structure according to claim 13, wherein the damping member is a columnar connecting portion.

17. The vehicle steering wheel structure according to claim 13, wherein the bracket is formed in a ring form and generally surrounds the damper module.

18. A vehicle steering wheel structure comprising:
a plurality of damper masses arranged so as to be distributed in an inner region of a steering wheel;
a connection member that connects the plurality of damper masses and is coated with a damping material; and
the plurality of damper masses and the connection member forming a damper module disposed in the inner region of the steering wheel;
wherein the plurality of damper masses are fixedly attached to the connection member and directly contact the connection member;
wherein the damper masses vibrate together with each other based on the fixed attachment and direct contact of the plurality of damper masses to the connection member;
wherein at least two damper masses of the plurality of damper masses are positioned bilaterally symmetrical about a shaft coupling portion of the steering wheel.

* * * * *